United States Patent [19]
Satani et al.

[11] Patent Number: 6,062,593
[45] Date of Patent: May 16, 2000

[54] SIDE AIR BAG APPARATUS FOR VEHICLE

[75] Inventors: Kenji Satani; Yoshiyuki Iwamoto; Kazuhiro Matsuhashi; Kiyoshi Hayashi, all of Hiroshima, Japan

[73] Assignee: Mazda Motor Corporation, Hiroshima, Japan

[21] Appl. No.: 08/891,762

[22] Filed: Jul. 14, 1997

[30] Foreign Application Priority Data

Jul. 12, 1996 [JP] Japan .................................. 8-183283

[51] Int. Cl.⁷ .................................................. B60R 21/22
[52] U.S. Cl. .................... 280/730.2; 297/216.13
[58] Field of Search ............................ 280/730.2, 730.1, 280/728.2, 728.3; 297/216.13

[56] References Cited

U.S. PATENT DOCUMENTS

| | | | |
|---|---|---|---|
| 5,324,071 | 6/1994 | Gotomyo et al. | 280/730.1 |
| 5,503,428 | 4/1996 | Awotwi et al. | 280/730.2 |
| 5,505,486 | 4/1996 | Ahn | 280/730.1 |
| 5,536,038 | 7/1996 | Bollaert et al. | 280/730.2 |
| 5,540,460 | 7/1996 | Wipasuramonton | 280/730.1 |
| 5,542,696 | 8/1996 | Steffens, Jr. et al. | 280/730.2 |
| 5,556,129 | 9/1996 | Coman et al. | 280/730.2 |
| 5,639,111 | 6/1997 | Spencer et al. | 280/730.2 |
| 5,651,582 | 7/1997 | Nakano | 280/730.2 |
| 5,676,394 | 10/1997 | Maly | 280/730.2 |

FOREIGN PATENT DOCUMENTS

| | | |
|---|---|---|
| 6-64491 | 3/1994 | Japan . |
| 8-242967 | 9/1996 | Japan . |

*Primary Examiner*—Peter C. English
*Attorney, Agent, or Firm*—Nixon Peabody LLP; Donald R. Studebaker

[57] ABSTRACT

A side air bag apparatus installed within a seat has an air bag unit containing an inflator and a folded air bag in an air bag unit housing which is placed on a side of the center of the seat with respect to and in close proximity to a frame member extending along a side section of the seat so as to direct an opening of the air bag unit housing in a specified direction. The air bag unit housing is secured to the frame member by a bracket frame.

22 Claims, 8 Drawing Sheets

SIDE AIR BAG APPARATUS FOR VEHICLE

BACKGROUND OF THE INVENTION

1. Field of the Invention

This invention relates to an air bag apparatus as a supplemental restraint system for a vehicle, and, more particularly, to a side air bag apparatus having an air bag unit installed within a seat.

2. Description of Related Art

An air bag apparatus, which typically has an air bag unit installed in the inside of a steering wheel, automatically serves as a supplemental restraint system to protect a driver sitting in the driver's seat and fastened by a seat belt upon an occurrence of a frontal collision. In recent years, in order to protect drivers and/or passengers against side collision, it is becoming widespread to provide a side air bag apparatus with an air bag unit installed at one side of a seat. Such a side air bag apparatus is known from, for example, Japanese Unexamined Patent Publication No. 6-64491.

In order to ensure stiffness and rigidity of a seat, the seat is typically encircled and reinforced by a metal frame. In cases where an air bag unit is placed within one side of the seat, because the air bag unit is surrounded by a cushioning pad, the air bag unit encounters deformation or is possibly damaged when, for example, the seat at its opposite sides is held by a robot and installed to a vehicle. Further, when a person puts a cargo into the vehicle, the seat at its side is possibly hit by the cargo. In that point of view, the air bag unit needs improved protection against an external lateral impact. Some of side air bag apparatuses have an air bag unit attached to the seatback frame from the outside. Such a side air bag apparatus is known from, for example, Japanese Unexamined Patent Publication No. 8-242967.

SUMMARY OF THE INVENTION

It is accordingly an object of the invention to provide an air bag unit under improved protection against an external lateral impact by way of the utilization of a seat frame member installed within a seat for reinforcing the seat.

The foregoing object of the invention is accomplished by providing an air bag apparatus having an air bag unit installed within a seat, in more detail a seat cushion or a seatback, of a vehicle so that the air bag unit is placed in close proximity to one side of a seat frame member extending in close proximity to a side section of the seat and on a side remote from an outer side surface of the seat with respect to the seat frame member. The air bag unit is secured to the seat frame member and positioned so as to direct the front opening through which an air bag thrusts out in a specified direction.

The air bag unit may be installed in a seatback, more preferably in a side bolster of the seatback, of the seat or in a seat cushion, more preferably in a side bolster of the seat cushion, of the seat. Correspondingly, in the case where the air bag unit is installed in the seatback or the seatback side bolster, the seat frame member may comprise a pipe frame. In the case where the air bag unit is installed in the seat cushion or in the seat cushion side bolster, the seat frame member may comprise a plate covering an approximately whole area of the seat cushion and supporting the seat cushion from the back.

The air bag unit is preferably placed with an outermost edge of the air bag unit on a side remote from an outer side surface of the seatback or the seat cushion with respect to the side section thereof. In addition, the air bag unit is inclined to direct the front opening forward and outward.

The air bag apparatus of the invention enjoys a good protection against an external lateral impact upon an occurrence of a lateral collision of the vehicle. In detail, because the air bag unit is placed in a space formed within the left seatback bolster which is defined by vertical planes perpendicularly intersecting each other and being in external contact with the outer surface of the seat frame member, the air bag unit is prevented from a kick by a passenger sitting on a rear seat of the vehicle or from encountering an external impact from a cargo put on the rear seat. In addition, since the air bag unit is on the inside from the vertical planes in external lateral contact with the side surface of the seat frame member, it is free from directly receiving an external impact applied to the seatback. Furthermore, the position of the air bag unit within the seatback bolster in which the front opening is directed forward and outward causes easy extension of the air bag between the side door and the passenger sitting on the seat, ensuring protection of the passenger from a collision against the side door. The seat frame member forms a strongly-built structure, and hence supports the air bag unit with improved supporting rigidity and stiffness.

Further, because the air bag unit is placed in the inside of the seat frame member, even when the seat at its opposite sides is held by a robot during assembling or encounters an external lateral impact, it is protected against deformation by the rigid seat frame member. Although the seat bolster decreases its height as it is remote from the seatback or the seat cushion, the air bag unit having the inner front edge formed with an upper half section sloped backward provides the bolster with a sufficient cushioning thickness, preventing passengers sitting on the seat from having an unpleasant feeling. In addition, since the air bag unit has no sloped sections of the front edge excepting the one upper half section, it does not produce an adverse effect to the extensibility of the air bag.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
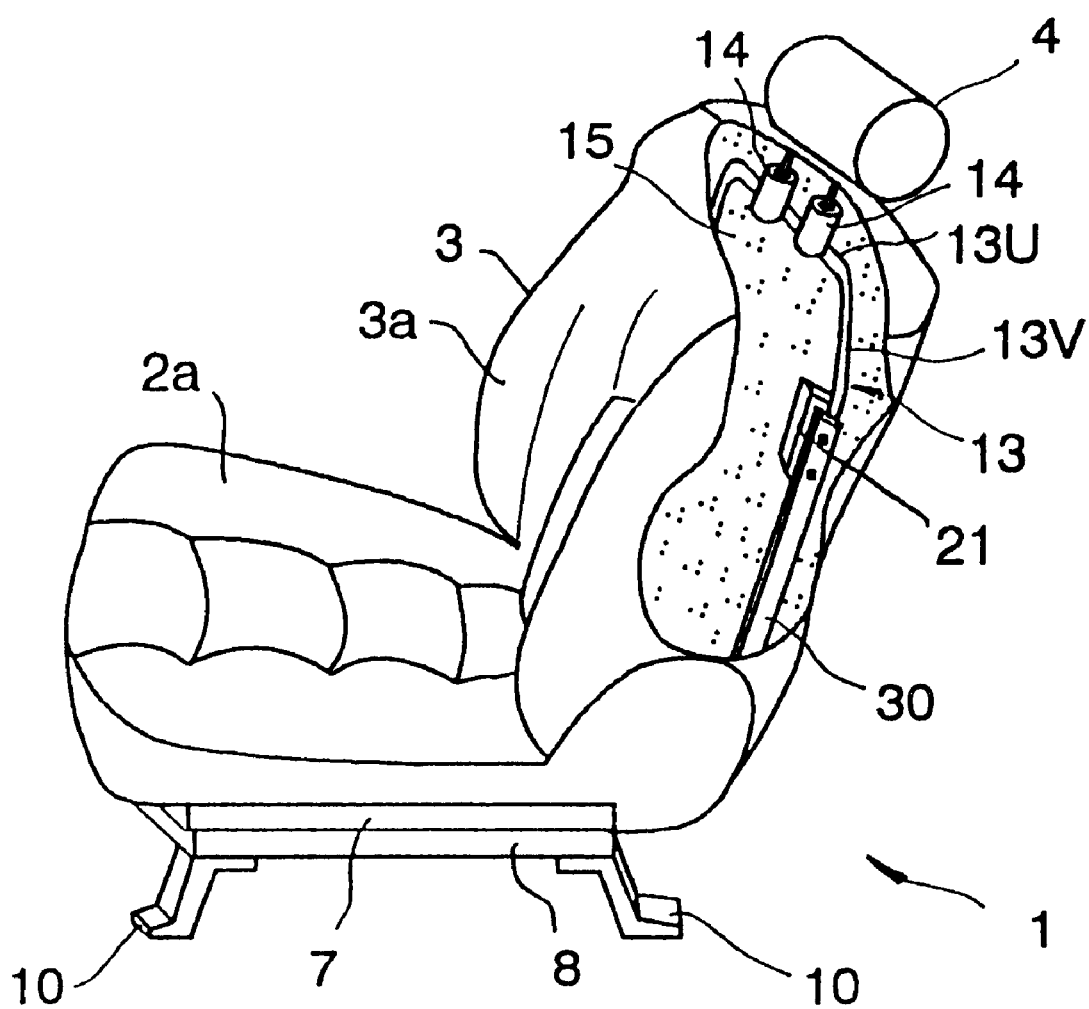
FIG. 1 is a perspective view of a seat in which an air bag apparatus in accordance with an embodiment of the invention is installed.
Figure 2:
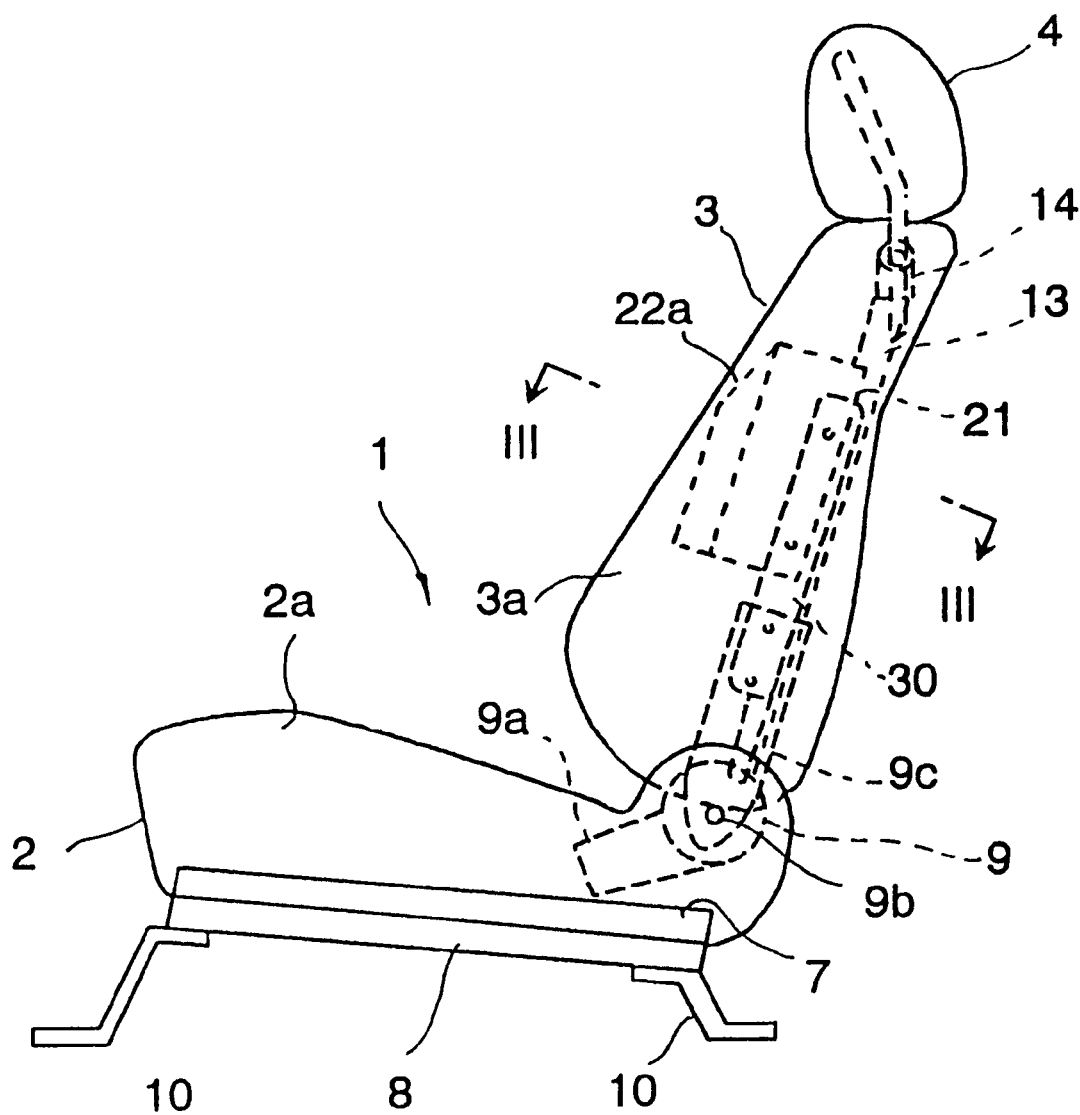
FIG. 2 is a side of the seat shown in FIG. 1.

Referring to the drawings in detail, particularly to FIGS. 1 and 2 which show a front passenger's seat 1 with a side air bag apparatus installed therein. The seat comprises a seat cushion 2, a seatback 3 and a head restraint 4. The seat cushion 2 is provided with a slider bar 7 secured to the under side thereof at each side. The slide bars 7 are put on a pair of parallel guide rails 8 for slide movement in a longitudinal direction extending from front to back of a vehicle and locked to adjust the seat in longitudinal position. Each side rail 8 at its front and rear ends is secured to a floor panel (not shown) by means of brackets 10. A knuckle mechanism 9 connects these seat cushion 2 and seatback 3 so that the seatback 3 is folded between a flat position and an upright position. The seatback angle is changed by means of a seatback angle adjustment mechanism (not shown). The knuckle mechanism 9 comprises a bracket 9a secured to each rear end of the seat cushion, a transverse hinge shaft 9b supported by the brackets 9a and a knuckle arm 9c secured to each side of the seatback 3. The head restraint 4 has a generally U-shaped frame 5 having a pair of pipe-shaped guide legs which extend out of the head restraint 4 and are received by head restraint vertical adjustment cylinders 14 for vertical position adjustment. The head restraint 4 is pulled up to be raised or pushed down to be lowered. The seatback 3 at its rear section is encircled and reinforced by a rectangularly-shaped seatback frame member 13 comprising vertical side sections 13V, an upper transverse section 13U and a lower transverse section 13L and made of a steel pipe. The seatback frame member 13 is generally rectangularly-shaped so as to conform to the shape of the seatback 3. One of the vertical side sections extends along the left side of the seatback 3. The seatback frame member 13 at its upper transverse section securely supports the head restraint vertical adjustment cylinders 14. As seen in FIG. 1, the seat cushion 2 has a seat cushion side bolster 2a swelled upward at each side, and the seatback 3 has a side bolster 3a swelled forward at each side.

Figure 3:
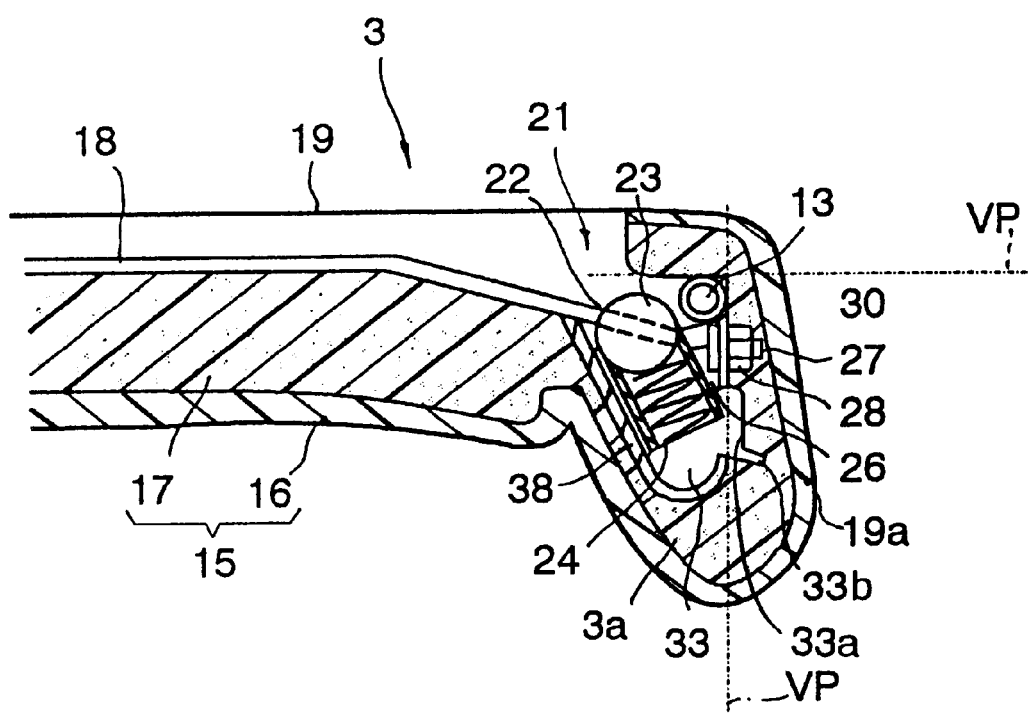
FIG. 3 is a cross-sectional view of FIG. 2 taken along line III—III.
Figure 4:
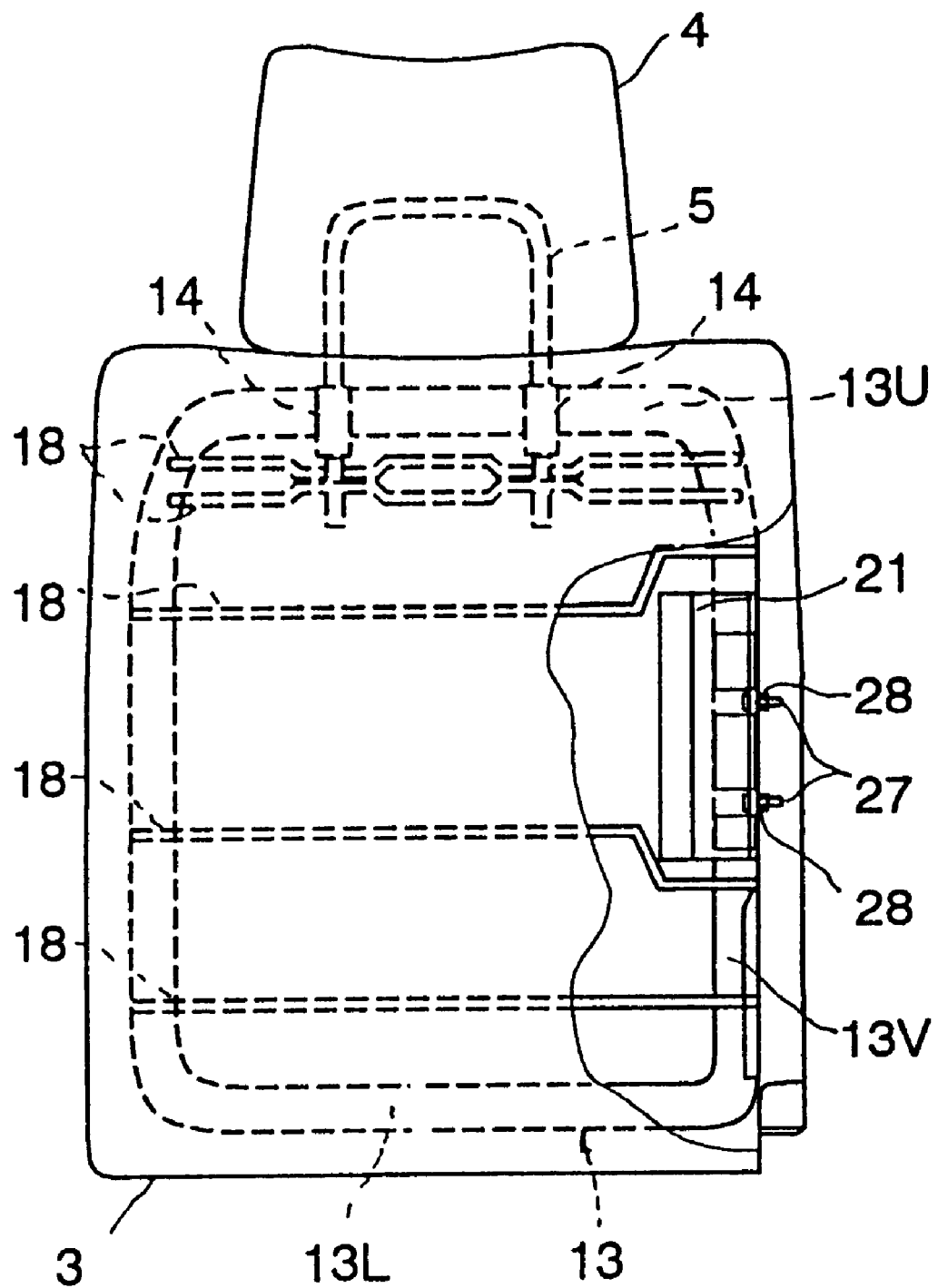
FIG. 4 is a partly broken front view of a seatback of the seat.

As clearly shown in FIGS. 3 and 4, the seatback 3 is provided with a plurality of, for example five in this embodiment, wire strings 18 transversely extending between and welded, or otherwise secured, to side sections of the seatback frame member 13. This wire string 18 has a diameter smaller than that of the steel pipe of the seatback frame member 13. A seatback pad 15 is supported in such a way as to hold the seatback frame member 13 with each vertical side section 13V surrounded by a rear side section of the seatback pad 15 extending from the side to the back of the respective vertical side section 13V. The wire strings 18 bear up the seatback pad 15 so as to prevent the seatback pad 15 from sinking backward when the person sitting on the seat 1 leans against the seatback 3. The seatback pad 15 comprises an urethane foam core pad 17 and an urethane foam cover pad 16 softer than the urethane foam core pad 17. The seatback 3 at its back is empty behind the wire strings 18 and covered by a thin outer cloth cover 19.

Figure 5:
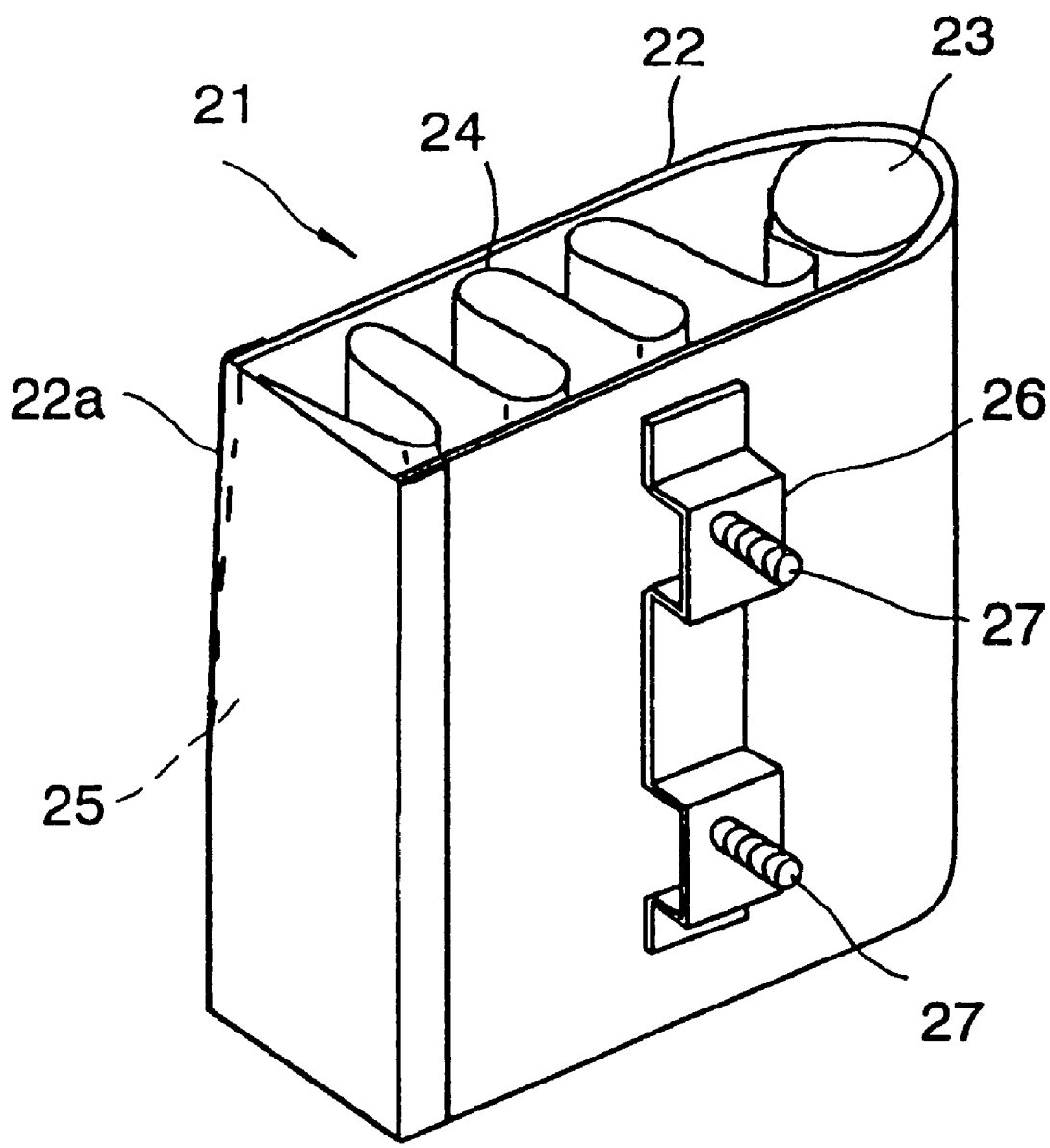
FIG. 5 is an external view of an air bag unit.

The seat 1 is provided with an air bag unit 21 installed within one of the seatback side bolsters 3a of the seatback 3, which is adjacent directly to a left door 40 (see FIG. 7) of the vehicle, for holding the passenger sitting on the seat 1. The air bag unit 21 is positioned in close proximity to the respective side vertical section 13V of the seatback frame member 13. As shown in FIG. 5, the air bag unit 21 comprises a unit housing 22 having a U-shaped cross-section and serving as a reaction can, a hollow cylinder inflator 23 containing a firing mechanism and an explosive (both not shown) therein, and a folded air bag 24. The front opening 25 of the unit housing 22 is closed by paper. When the air bag 24 is inflated, it expands forward tearing the papered front opening 25 of the unit housing 22. The unit housing 22 has front edge 22a, the inner or right one of which is formed with an upper half section sloped backward. The firing mechanism receives a firing signal from a lateral acceleration sensor (not shown) and fires an explosive to produce and blow a large amount of gas by which the air bag 24 is inflated and expanded.

The air bag unit 21 is installed within a space 33 formed in the inside of the left seatback side bolster 3a of the seatback pad 15. Specifically, the air bag unit 21 is placed in such a position as to put the inflator 23 in close proximity to the left side vertical section 13V of the seatback frame member 13 and direct the papered front opening 25 forward to the left. The entire air bag unit 21 is in the inside space defined by vertical planes VP perpendicularly intersecting each other and being in external contact with the outer surface of the left side vertical section 13V of the seatback frame member 13. Further, the air bag unit 21 is inclined upward with respect to the floor of the vehicle so as to direct the papered front opening 25 slightly upward with respect to a horizontal plane when the seatback 3 is adjusted with respect to the seat cushion at a regular angle appropriate for the passenger sitting on the seat 1.

The space 33 is specifically defined by an inner wall 33a in the left seatback side bolster 3a. In the space 33, a bracket frame 30 extends along and is secured to the left side vertical section 13V of the seatback frame member 13 from the inside. On the other hand, the air bag unit 21 is provided with a fitting member 26 welded, or otherwise secured, to the side wall of the unit housing 22. The air bag unit 21 is bolted by fixing bolts 27 and nuts 28, or otherwise secured, to the bracket frame 30. In such a way, the air bag unit 21 is rigidly supported by the seatback frame member 13. The bracket frame 30 at its lower end is bolted, or otherwise secured, to the knuckle arm 9c of the knuckle mechanism 9 installed in the seat 1. The seatback pad 15 is formed with a vertical notch 33b or a vertical groove in the inner wall 33a facing the papered front opening 25 of the unit housing 22 of the air bag unit 21 placed in the space 33. This vertical notch 33b faces directly the papered front opening of the unit housing 22 of the air bag unit 21 and has a vertical length slightly longer or approximately equal to the length of the unit housing 22 of the air bag unit 21. Further, the seatback pad 15 has a seam 19a on the horizontal extension of the vertical notch 33b and formed in the outer cloth cover 19. Part of the seatback pad 15 thus structured is easily torn and broken in a direction toward the seam 19a from the vertical notch 33b as expansion of the air bag 24 progresses, and finally opens along the seam 19a to permit the expanding air bag 24 to jut out of the seatback 3 through the opening. The urethane foam core pad 17 along the space 33 which faces the air bag unit 21 is provided with a felt pad 38 integrally secured thereto. The utilization of the felt pad 38 prevents part of the urethane foam core pad 17 from flying off when the seatback pad 15 is broken due to expansion of the air bag 24 and prevents noises caused due to a rub between the air bag unit 21 and the urethane foam core pad 17 of the seatback pad 15.

Figure 6:
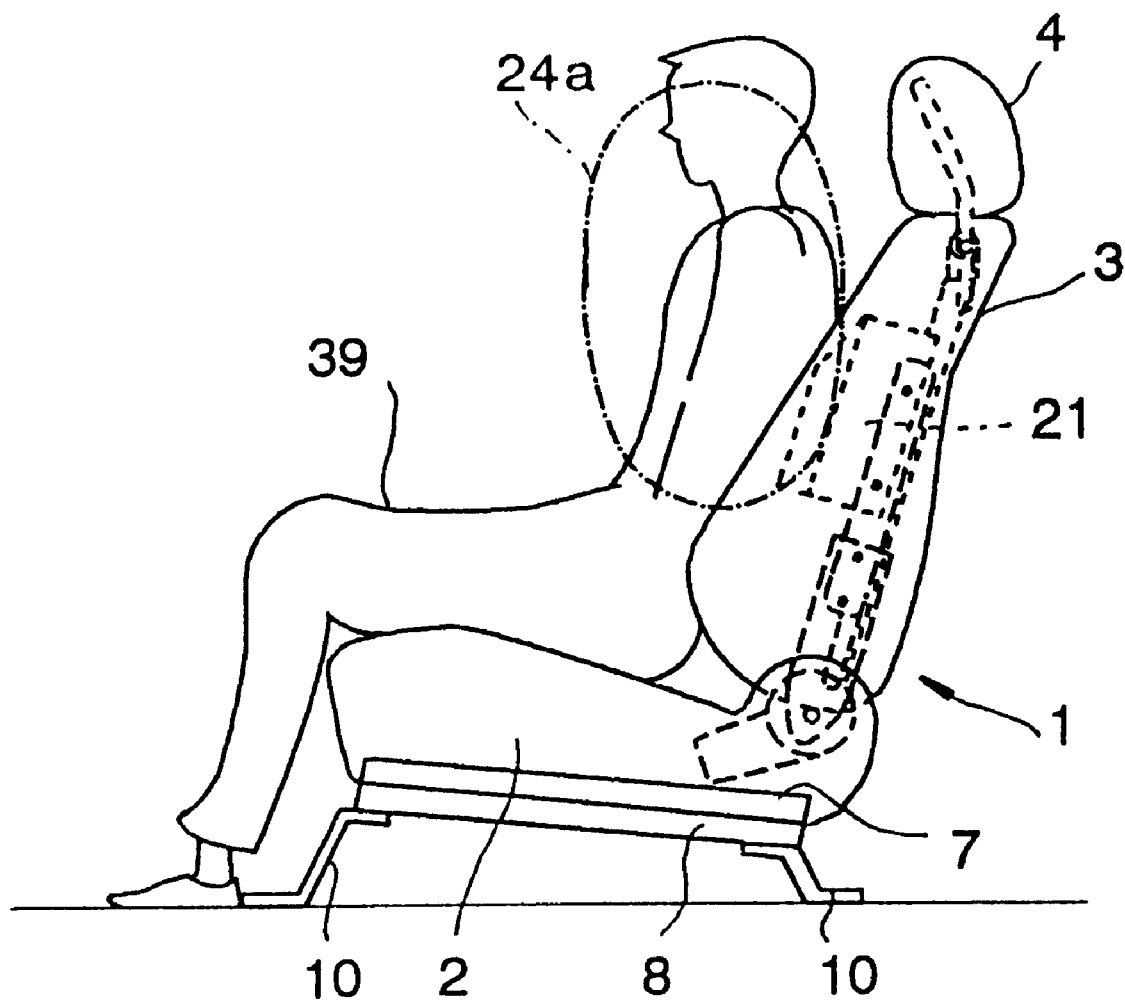
FIG. 6 is an explanatory side view showing an expanded air bag.
Figure 7:
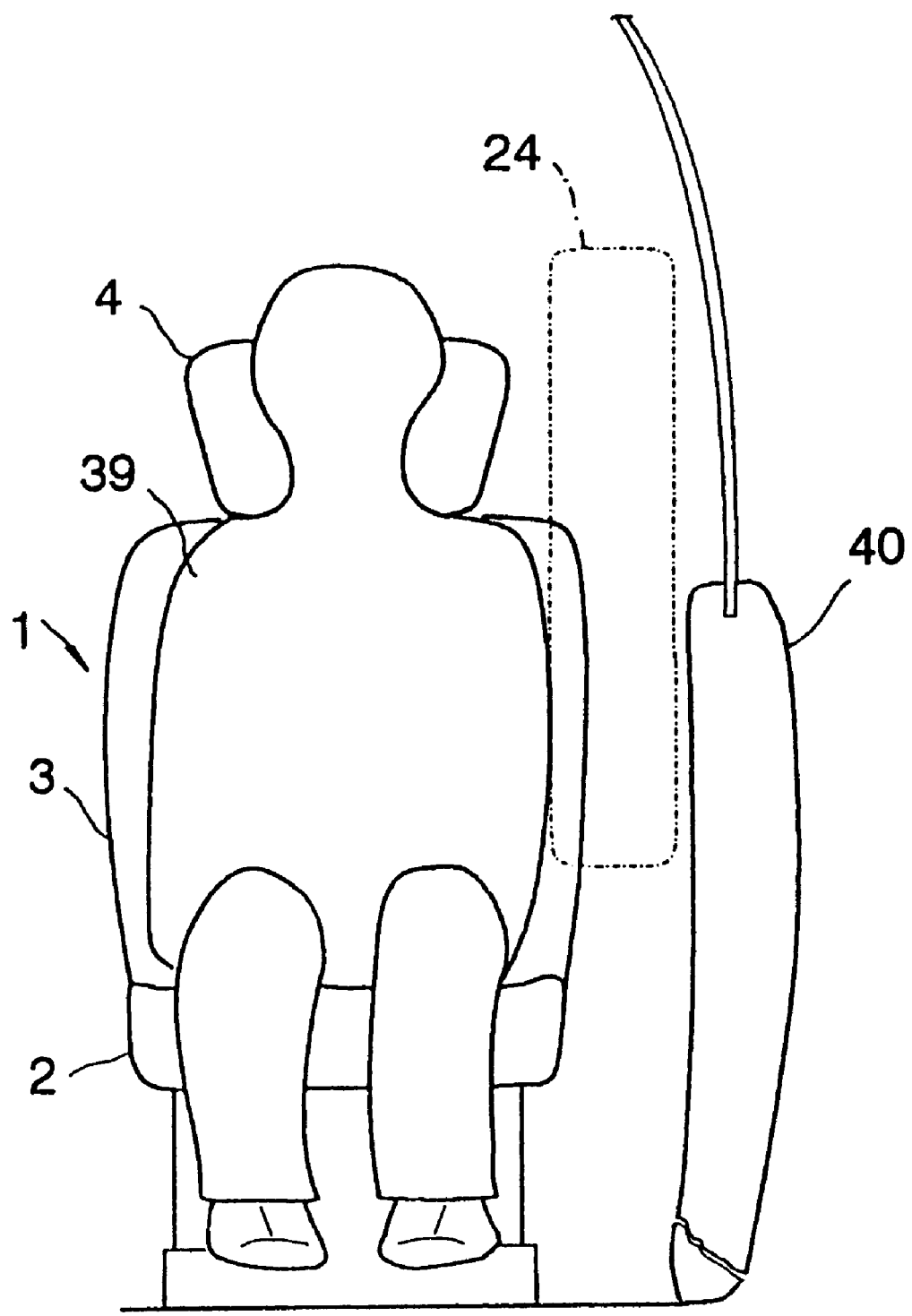
FIG. 7 is an explanatory front view showing an expanded air bag.

As shown in FIGS. 6 and 7, the air bag 24 expands vertically in a fashion of a generally rectangularly-shaped balloon between the front left door 40 and the passenger 39 sitting on the seat 1 so as to extend over the upper body and the head of the passenger 39.

In operation of the air bag apparatus of the embodiment as described above, in response to a firing signal generated by the lateral acceleration sensor upon an occurrence of a left side lateral collision of the vehicle, the firing mechanism fires the explosion in the inflator 23 to produce and blow a large amount of gas into the air bag 24. As a result, the air bag 24 is rapidly inflated and expanded by the gas to tear the part of the seatback pad 15 at the vertical notch 33b. With rapid progress of expansion of the air bag 24, the part of the seatback pad 15 is torn and broken toward the seam 19a of the outer cloth cover 19 and finally opens the outer cloth cover 19 along the seam 19a, permitting the air bag 24 still inflating and expanding to jut out from the seatback 3 and extend between the front left door 40 and the passenger 39. The air bag unit 21, which is inclined upward to direct the papered front opening 25 slightly upward with respect to a horizontal plane when the seatback 3 is adjusted with respect to the seat cushion 2 at a regular angle appropriate for the passenger sitting on the seat 1, causes the air bag 24 to expand forward up toward the head of the passenger 39, so as to instantaneously extend over the upper body and the head of the passenger 39 and protect him or her from a collision against the front left door 40.

According to the air bag apparatus of the embodiment described above, because the air bag unit 21 is placed in the inside space 33 of the left seatback bolster 3a which is defined by vertical planes VP perpendicularly intersecting each other and being in external contact with the outer surface of the left side vertical section 13V of the seatback frame member 13, the air bag unit 21 is prevented from a kick by a passenger sitting on a rear seat of the vehicle or from encountering an external impact from a cargo put on the rear seat. In addition, since the air bag unit 21 is on the inside from the vertical plane VP in external lateral contact with the side surface of the left side vertical section 13V of the seatback frame member 13, it is free from directly receiving an external impact applied to the seatback 3. In such a way, the air bag unit 21 enjoys a good protection against an external lateral impact upon an occurrence of a lateral collision of the vehicle. Further, the position of the air bag unit 21 within the left seatback bolster 3a in which the papered front opening 25 is directed forward to the left causes easy extension of the air bag 24 between the front left door 40 and the passenger 39 sitting on the seat 1, ensuring protection of the passenger from a collision against the front left door 40. Furthermore, the seatback frame member 13 and the bracket frame 30 forming a strongly-built structure supports the air bag unit 21 with improved supporting rigidity and stiffness.

The left seatback bolster 3a which can provide a large space therein enables it easy to install the air bag unit 21 in the seatback 3. Although the seatback bolster 3a decreases its height from the seatback 3 as it is remote from the seat cushion 2, the air bag unit 21 having the inner front edge 22a formed with an upper half section sloped backward provides the left seatback bolster 3a with a sufficient cushioning thickness, so as to prevent the passenger sitting on the seat 1 from having an unpleasant feeling at his or her back. In addition, since the air bag unit 21 has no sloped sections of the front edge 22a excepting the right upper half section, it does not produce an adverse effect to the extensibility of the air bag 24. Accordingly, the air bag unit 21 is installed within the seatback 3 without loosing a comfortable feeling of sitting on the seat 1 and the extensibility of the air bag 24. Furthermore, because the air bag unit 21 is placed in the inside of the seatback frame member 13, even when the seatback 3 at its opposite sides is held by a robot during assembling or encounters an external lateral impact, it is protected against deformation by the undeformable seatback frame member 13 and bracket frame 30.

Although, in the above embodiment, the air bag unit 21 is installed within the left seatback bolster 3a, it may be effective to install the air bag unit 21 in the right seatback bolster 3a of the seat 1 with the same result. In this case, the passengers sitting on the left and right seats are prevented from hitting their head against each other. In addition, the air bag unit 21 may be installed in the inside of the seat bolster 2a so as to direct the papered front opening 25 upward. In this instance, the slider bars 7 are adapted to serve as a seat cushion frame, and air bag unit 21 is placed on the side of the slider bar 7 remote from the door.

Figure 8:
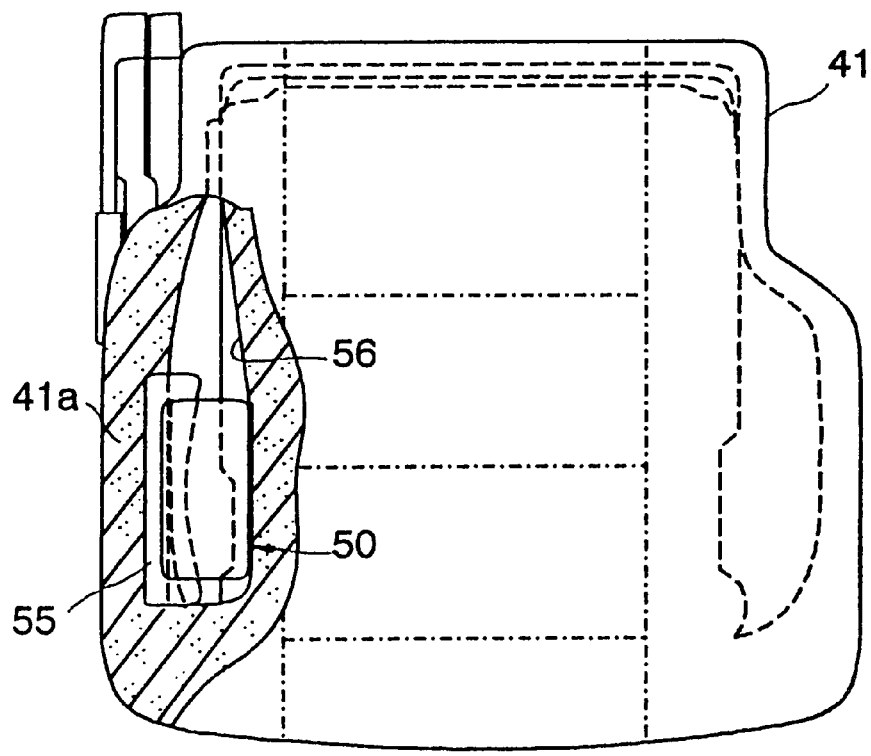
FIG. 8 is a top view of a seat cushion in which an air bag apparatus in accordance with another embodiment of the invention is installed.
Figure 9:
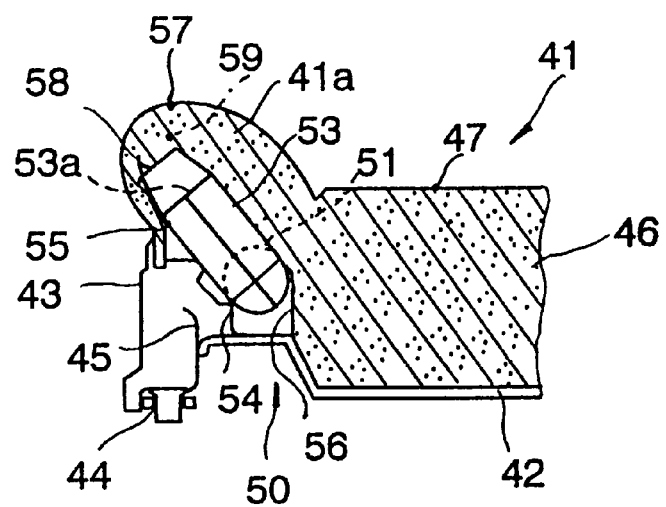
FIG. 9 is a front view, partly in cross section, of an essential part of the seat cushion.

FIGS. 8 and 9 show an air bag apparatus installed as a supplemental restraint system for a driver in accordance with another embodiment of the invention. A driver's seat similar to the passenger's seat 1 has a seat cushion 41 comprising a cushioning pad 46, a plate-like seat cushion frame member 42 onto which the cushioning pad 46 is attached, a side garnish 43 secured to each side of the seat cushion frame member 42, and a slider bar 45 interposed between the seat cushion frame member 42 and the side garnish 43 at each side of the seat and slidable on a guide rail 44 disposed on the vehicle floor (not shown). The cushioning pad 46 is enclosed by an outer cloth cover 47. The seat cushion 41 at each of its sides is formed with a seat cushion side bolster 41a swelled upward. An air bag unit 50 is installed within a space formed in the right side bolster 41a. This air bag unit 50 is similar in structure and operation to that shown in FIG. 5 and comprises an air bag unit housing 53 having a U-shaped cross-section and serving as a reaction can, a hollow cylinder inflator 51 containing a firing mechanism and an explosive (both not shown) therein, and a folded air bag (not shown). The front opening 53a of the unit housing 53 is closed by paper. The air bag unit housing 53 is bolted, or otherwise secured, to the seat cushion frame member 42 by means of a fitting bracket 54. A deflector 55 made of a thin plate is secured to the fitting bracket 54 and the air bag unit housing 53 so as to direct the air bag upward and slightly backward. The space 56 formed in the right side bolster 41a extends gradually narrowing backward so as to make the air bag expand easily backward. Part of the cushioning pad 46 facing the papered front opening 53a is formed with an approximately horizontal notch or approximately horizontal groove line 58 along which the cushioning pad 46 is easily broken, and the outer cloth cover 47 at that part is provided with a seam 57 along which the outer cloth cover 47 is torn by the air bag inflating and expanding. Accordingly, with progress of inflation and expansion of the air bag, the part of the cushioning pad 46 is opened along the weakened line and the seam 57 to permit the air bag to jut out of the seat cushion 41.

In operation of the air bag apparatus of the above embodiment as described above, in response to a firing signal generated by the lateral acceleration sensor upon an occurrence of a right side lateral collision of the vehicle, the firing mechanism fires the explosion in the inflator 51 to produce and blow a large amount of gas into the air bag. As a result, the air bag is rapidly inflated and expanded by the gas to tear the part of the cushioning pad 46 along the approximately horizontal groove line 58, and then along a breaking line 59. With rapid progress of expansion of the air bag, the part of the cushioning pad 46 is torn and broken and finally opens the outer cloth cover 47 along the seam 57, permitting the air bag still inflating and expanding to jut out from the seat cushion 41 and extend between the front right door and the driver sitting on the driver's seat. During jutting out from the seat cushion 41, the air bag is guided upward and slightly backward between the driver sitting on the driver's seat and the front right door by means of the deflector 55. Accordingly, the air bag 24 expands toward the head of the driver, so as to instantaneously extend over the upper body and the head of the driver and protect him or her from a collision against the front right door.

Directing the air bag unit 50 in a specific direction different from the vertical direction provides the right side bolster 41a with a sufficient cushioning thickness. Furthermore, if the deflector 55 is not provided, the air bag needs to be guided by means of the inner wall surface of a door trim, imposing design restraints on the door trim. However, since the air bag of this embodiment is guided by the deflector 55, the door trim is endowed an increased freedom of design.

It is to be understood that the present invention may be embodied with various changes, modifications and improvements, which may occur to those skilled in the art, without departing from the spirit and scope of the invention defined in the following claims.

What is claimed is:

1. A side air bag apparatus installed within a seatback of a seat of a vehicle, said air bag apparatus comprising:

a generally rectangularly-shaped pipe frame member having at least an upper frame section and opposite side frame sections which extend in close proximity to and along upper and opposite side sections of said seatback, respectively, so as to provide a space therebetween;

an air bag unit housing having an opening, said air bag unit housing being disposed close to one of said side frame sections of said pipe frame member adjacent to a door of the vehicle;

an air bag folded within said air bag unit housing;

an inflator including an explosive in said air bag unit housing; and a fitting member for fitting said air bag unit housing to said pipe frame member and placing said air bag unit housing in said space defined between said side frame sections of said pipe frame member and below said upper frame section of said pipe frame member so as to direct said opening of said air bag unit housing in a specified direction between said door and a passenger sitting on said seat;

wherein said inflator fires said explosive to produce and blow gas into said air bag to inflate, expand and thrust out said air bag through said opening of said air bag unit housing and between said door and said passenger upon an occurrence of a lateral collision of the vehicle.

2. A side air bag apparatus as defined in claim 1, wherein said air bag unit housing is placed with an outermost edge of said air bag unit housing on a side of said one of said side frame sections of said pipe frame member remote from an outer side surface of the seatback with respect to said one of said side frame sections of said pipe frame member.

3. A side air bag apparatus as defined in claim 1, wherein said air bag unit housing is inclined to direct said opening forward and outward.

4. A side air bag apparatus as defined in claim 3, wherein said air bag unit housing is installed within a side bolster of said seatback.

5. A side air bag apparatus as defined in claim 1, and further comprising a felt pad secured to said seatback which extends in a direction in which said air bag is thrusted out through said opening of said air bag unit housing, wherein said fitting member is secured to one side of said air bag unit housing close to said one of said side frame sections of said pipe frame member for fitting said air bag unit housing to said pipe frame member so as to direct said opening of said air bag unit housing forward toward an outside of the seatback.

6. A side air bag apparatus as defined in claim 5, and further comprising a bracket connected between a knuckle mechanism for supporting said seatback and said one of said side frame sections of said pipe frame member, through which said fitting member is secured to said one of said side frame sections of said pipe frame member.

7. A side air bag apparatus as defined in claim 1, and further comprising a bracket connected between a knuckle mechanism for supporting said seatback and said one of said side frame sections of said pipe frame member, through which said air bag unit housing is secured to said one of said side frame sections of said pipe frame member.

8. A side air bag apparatus installed within a seatback of a seat of a vehicle, said air bag apparatus comprising:

a generally rectangularly-shaped pipe frame member having at least an upper frame section and opposite side frame sections which extend in close proximity to and along upper and opposite side sections of said seatback, respectively, so as to provide a space therebetween;

an air bag unit housing having an opening and a closed end, said air bag unit housing being disposed close to one of said side frame sections of said pipe frame member adjacent to a door of the vehicle;

an air bag folded within said air bag unit housing;

an inflator including an explosive in said air bag unit housing; and a fitting member for fitting said air bag unit housing to said pipe frame member and placing said air bag unit housing in said space defined between said side frame sections of said pipe frame member and below said upper frame section of said pipe frame member so as to direct said opening of said air bag unit housing in a specified direction between said door and a passenger sitting on said seat and locate said closed end forward of a rear surface of said one of said side frame sections of said pipe frame member;

wherein said inflator fires said explosive to produce and blow gas into said air bag to inflate, expand and thrust out said air bag through said opening of said air bag unit housing and between said door and said passenger upon an occurrence of a lateral collision of the vehicle.

9. A side air bag apparatus as defined in claim 8, and further comprising a felt pad secured to said seatback which extends in a direction in which said air bag is thrusted out through said opening of said air bag unit housing, wherein said fitting member is secured to one side of said air bag unit housing close to said one of said side frame sections of said pipe frame member for fitting said air bag unit housing to said pipe frame member so as to direct said opening of said air bag unit housing forward toward an outside of the seatback.

10. A side air bag apparatus as defined in claim 8, and comprising a seatback bracket connected between a knuckle mechanism for supporting said seatback and said one of said side frame sections of said pipe frame member, through which said fitting member is secured to said one of said side frame sections of said pipe frame member.

11. A side air bag apparatus as defined in claim 8, and comprising a seatback bracket connected between a knuckle mechanism for supporting said seatback and said one of said side frame sections of said pipe frame member, through which said fitting member is secured to said one of said side frame sections of said pipe frame member.

12. A side air bag apparatus as defined in claim 8, and further comprising a seatback pad having a core pad in which said pipe frame member and said air bag unit housing are disposed, said air bag unit housing being located in a space provided behind said core pad.

13. A side air bag apparatus installed within a seatback of a vehicle having a generally rectangular shape, said air bag apparatus comprising:

a frame member having at least an upper frame section and side frame sections which extend in close proximity to and along upper and side sections of said seatback, respectively;

an air bag unit housing having an opening, said air bag unit housing being placed between said side frame sections of said frame member and in close proximity to one of said side frame sections of said frame member and fitted to said frame member so as to direct said opening in a specified direction;

an air bag folded within said air bag unit housing;

an inflator including an explosive in said air bag unit housing;

a fitting member secured to one side of said air bag unit housing close to said one of said side frame sections of said frame member for fitting said air bag unit housing to said frame member so as to direct said opening of said air bag unit housing forward toward an outside of said seatback; and a felt pad secured to said seatback which extends in a direction in which said air bag is thrusted out through said opening of said air bag unit housing;

wherein said inflator fires said explosive to produce and blow gas into said air bag to inflate, expand and thrust said air bag out of said air bag unit housing through said opening upon an occurrence of a lateral collision of the vehicle.

14. A side air bag apparatus installed within a seatback of a vehicle having a generally rectangular shape, said air bag apparatus comprising:

a frame member having at least an upper frame section and side frame sections which extend in close proximity to and along an upper section and side sections of said seatback, respectively;

an air bag unit housing having an opening, said air bag unit housing being placed between said side frame sections of said frame member and in close proximity to one of said side frame sections of said frame member and fitted to said frame member so as to direct said opening in a specified direction;

an air bag folded within said air bag unit housing;

an inflator including an explosive in said air bag unit housing; and a bracket connected between a knuckle mechanism for supporting said seatback and said one of said side frame sections of said frame member, through which said air bag unit housing is secured to said one of said side frame sections of said frame member;

wherein said inflator fires said explosive to produce and blow gas into said air bag to inflate, expand and thrust out said air bag through said opening of said air bag unit housing upon an occurrence of a lateral collision of the vehicle.

15. A side air bag apparatus installed within a seatback of a seat of a vehicle, said air bag apparatus comprising:

a generally rectangularly-shaped pipe frame member having at least an upper frame section and opposite side frame sections which extend in close proximity to and along upper and side sections of the seatback, respectively;

an air bag unit housing having an opening, said air bag unit housing being disposed below said upper frame section of said pipe frame member and close to one of said side frame sections of said pipe frame member adjacent to a door such as to be fitted to said pipe frame member so as to direct said opening in a specified direction between said door and a passenger sitting on said seat;

an air bag folded within said air bag unit housing;

an inflator including an explosive in said air bag unit housing; and a bracket connected between a knuckle mechanism for supporting said seatback and said one of said side frame sections of said pipe frame member at one side of said one of said side frame sections of said pipe frame member close to said door, to which said air bag unit housing is secured on another side of said one of said side frame sections of said pipe frame member;

wherein said inflator fires said explosive to produce and blow gas into said air bag to inflate, expand and thrust out said air bag through said opening of said air bag unit housing and between said door and said passenger upon an occurrence of a lateral collision of the vehicle.

16. A side air bag apparatus as defined in claim 15, wherein said air bag unit housing is inclined to direct said opening forward and outward.

17. A side air bag apparatus as defined in claim 16, wherein said air bag unit housing is installed within a side bolster of said seatback.

18. A side air bag apparatus as defined in claim 15, and further comprising a fitting member secured to said one of said side frame sections of said pipe frame member for attaching said air bag unit housing to said pipe frame member.

19. A side air bag apparatus installed within a seatback of a seat of a vehicle, said air bag apparatus comprising:

a generally rectangularly-shaped pipe frame member having at least an upper frame section and opposite side frame sections which extend in close proximity to and along upper and side sections of said seatback, respectively;

an air bag unit housing having an opening and a closed end, said air bag unit housing being disposed between said side frame sections of said pipe frame member and close to one of said side frame sections of said pipe frame member adjacent to a door such as to be fitted to said pipe frame member so as to direct said opening in a specified direction between said door and a passenger sitting on said seat and locate said closed end forward of a rear surface of said one of said side frame sections of said pipe frame member and below said upper frame section of said pipe frame member;

an air bag folded within said air bag unit housing;

an inflator including an explosive in said air bag unit housing; and a bracket connected between a knuckle mechanism for supporting said seatback and said one of said side frame sections of said pipe frame member at one side of said one of said side frame sections of said pipe frame member close to said door, to which said air bag unit housing is secured on another side of said one of said side frame sections of said pipe frame member;

wherein said inflator fires said explosive to produce and blow gas into said air bag to inflate, expand and thrust out said air bag through said opening of said air bag unit housing and between said door and said passenger upon an occurrence of a lateral collision of the vehicle.

20. A side air bag apparatus as defined in claim 19, wherein said air bag unit housing is inclined to direct said opening forward and outward.

21. A side air bag apparatus as defined in claim 20, wherein said air bag unit housing is installed within a side bolster of said seatback.

22. A side air bag apparatus as defined in claim 19, and further comprising a fitting member secured to said one of said side frame sections of said pipe frame member for attaching said air bag unit housing to said pipe frame member.

* * * * *